(12) United States Patent
Sakurai

(10) Patent No.: US 11,613,195 B2
(45) Date of Patent: Mar. 28, 2023

(54) BOARDING AND EXITING HANDRAIL

(71) Applicant: TOYOTA JIDOSHA KABUSHIKI KAISHA, Aichi-ken (JP)

(72) Inventor: Hideyuki Sakurai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 335 days.

(21) Appl. No.: 17/029,044

(22) Filed: Sep. 23, 2020

(65) Prior Publication Data
US 2021/0197701 A1    Jul. 1, 2021

(30) Foreign Application Priority Data

Dec. 26, 2019   (JP) .............................. JP2019-237527

(51) Int. Cl.
*B60N 3/02*   (2006.01)
*B60J 5/06*   (2006.01)

(52) U.S. Cl.
CPC .............. *B60N 3/023* (2013.01); *B60J 5/062* (2013.01); *B60N 3/02* (2013.01)

(58) Field of Classification Search
CPC . B60N 3/023; B60N 3/02; B60J 5/062; B60R 13/043; E06B 9/01; E06B 7/32; E06B 3/88; E06B 3/92
See application file for complete search history.

(56) References Cited

U.S. PATENT DOCUMENTS

| 1,910,883 | A | * | 5/1933 | Caroselli | ................. | E05C 17/30 292/262 |
| 2,111,059 | A | * | 3/1938 | Basel | ....................... | B60N 3/02 296/153 |
| 4,482,284 | A | * | 11/1984 | Robbins | ................. | A61G 3/062 414/539 |
| 4,626,016 | A | * | 12/1986 | Bergsten | ................. | B60N 3/02 105/354 |
| 5,076,547 | A | * | 12/1991 | Osterholm | ............. | E04F 11/18 52/150 |
| 5,910,077 | A | * | 6/1999 | Aumiller | ................ | B60N 2/797 49/460 |
| 6,340,189 | B1 | * | 1/2002 | Pordy | .................... | B60N 3/026 16/110.1 |

(Continued)

FOREIGN PATENT DOCUMENTS

JP            H8118958 A      5/1996

*Primary Examiner* — Jeffrey O'Brien
(74) *Attorney, Agent, or Firm* — Hauptman Ham, LLP

(57) ABSTRACT

A boarding and exiting handrail including: a base part provided near an entrance-and-exit of a vehicle so as to be rotatable with an axis oriented in an up-down direction; a handrail main part capable of being gripped by passengers boarding and exiting through the entrance-and-exit; and a rail part slidably holding a sliding member mounted on a sliding door that opens and closes the entrance-and-exit by moving along an outer wall surface of the vehicle. When the sliding door opens the entrance-and-exit, the boarding and exiting handrail assumes a deployed posture with the handrail main part and the rail part protruded toward the outside of the vehicle as seen from above, and when the sliding door closes the entrance-and-exit, the boarding and exiting handrail assumes a retracted posture with the handrail main part and the rail part disposed along the sliding door as seen from above.

4 Claims, 11 Drawing Sheets

(56) References Cited

U.S. PATENT DOCUMENTS

| | | | | |
|---|---|---|---|---|
| 6,425,572 B1* | 7/2002 | Lehr | ............... | B60R 3/02 |
| | | | | 182/127 |
| 7,364,219 B2* | 4/2008 | Lowson | ............ | E05F 15/63 |
| | | | | 296/146.12 |
| 8,613,475 B1* | 12/2013 | Statz | ............. | B60R 3/007 |
| | | | | 296/57.1 |
| 9,567,796 B2* | 2/2017 | Andrae | ............ | B60R 13/04 |
| 10,457,182 B2* | 10/2019 | McKinnon | ....... | B60N 3/026 |
| 10,946,780 B2* | 3/2021 | Bacon | ............ | E05B 1/0015 |
| 11,046,226 B1* | 6/2021 | Younce | ............ | B60N 3/023 |
| 11,433,796 B2* | 9/2022 | Sakurai | ........... | B60N 3/023 |
| 2017/0275937 A1* | 9/2017 | Park | ............... | E06B 3/5054 |
| 2020/0114797 A1* | 4/2020 | Sakurai | ........... | B60N 2/002 |
| 2020/0384902 A1* | 12/2020 | Sakurai | ........... | B60N 2/773 |
| 2022/0062471 A1* | 3/2022 | Sakurai | ........... | B60N 3/023 |
| 2022/0063471 A1* | 3/2022 | Sakurai | ............. | A61L 2/10 |
| 2022/0063472 A1* | 3/2022 | Sakurai | ........... | B60N 3/023 |
| 2022/0266735 A1* | 8/2022 | Sakurai | ........... | B60N 3/023 |
| 2022/0289091 A1* | 9/2022 | Sakurai | ........... | B60N 3/023 |

* cited by examiner

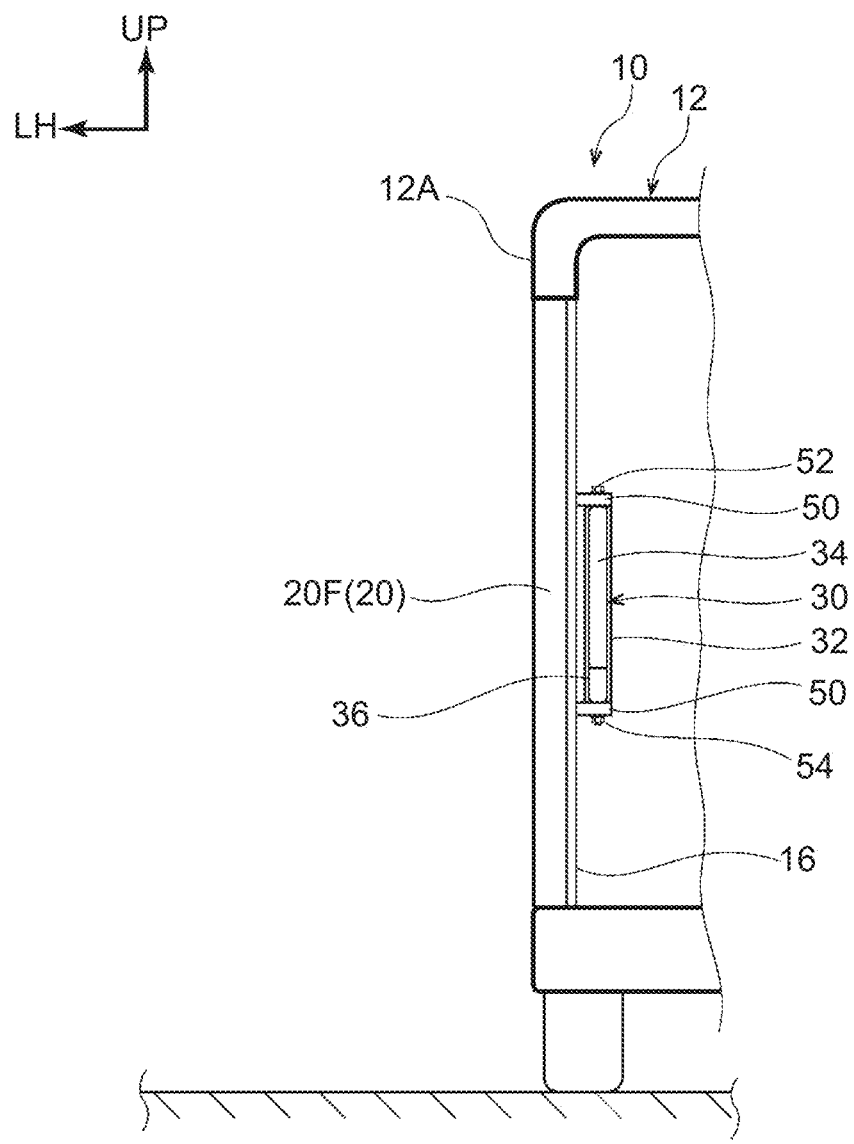

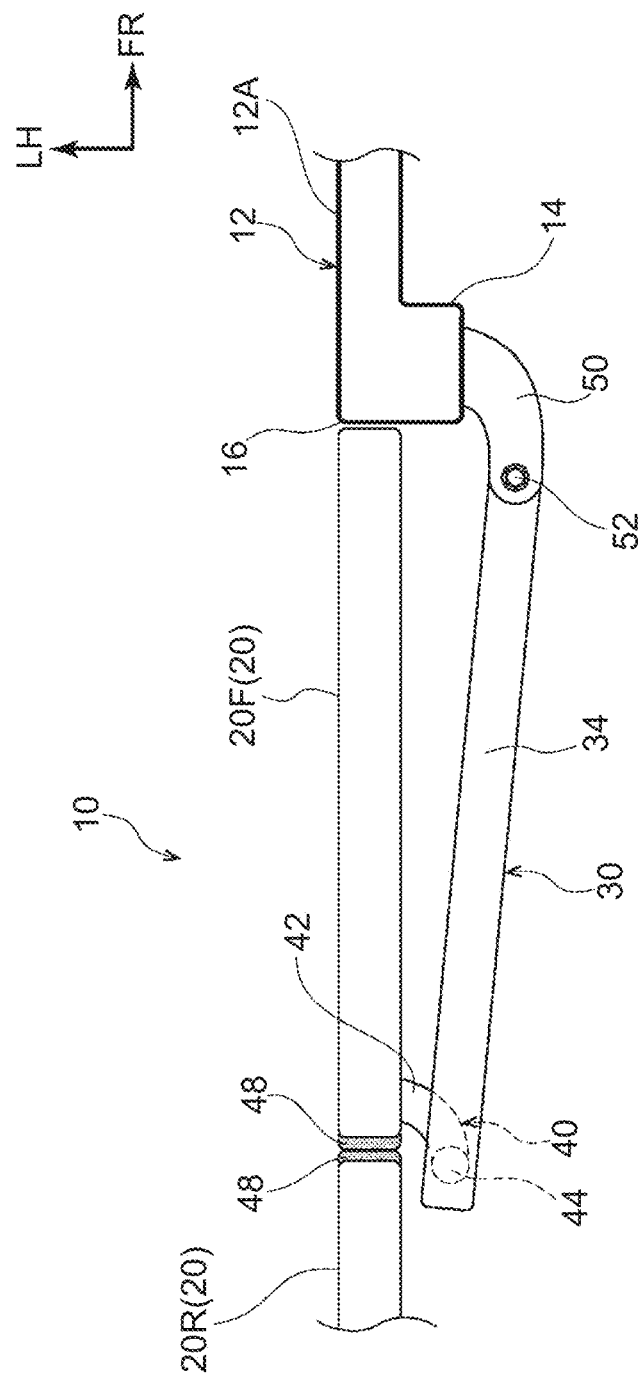

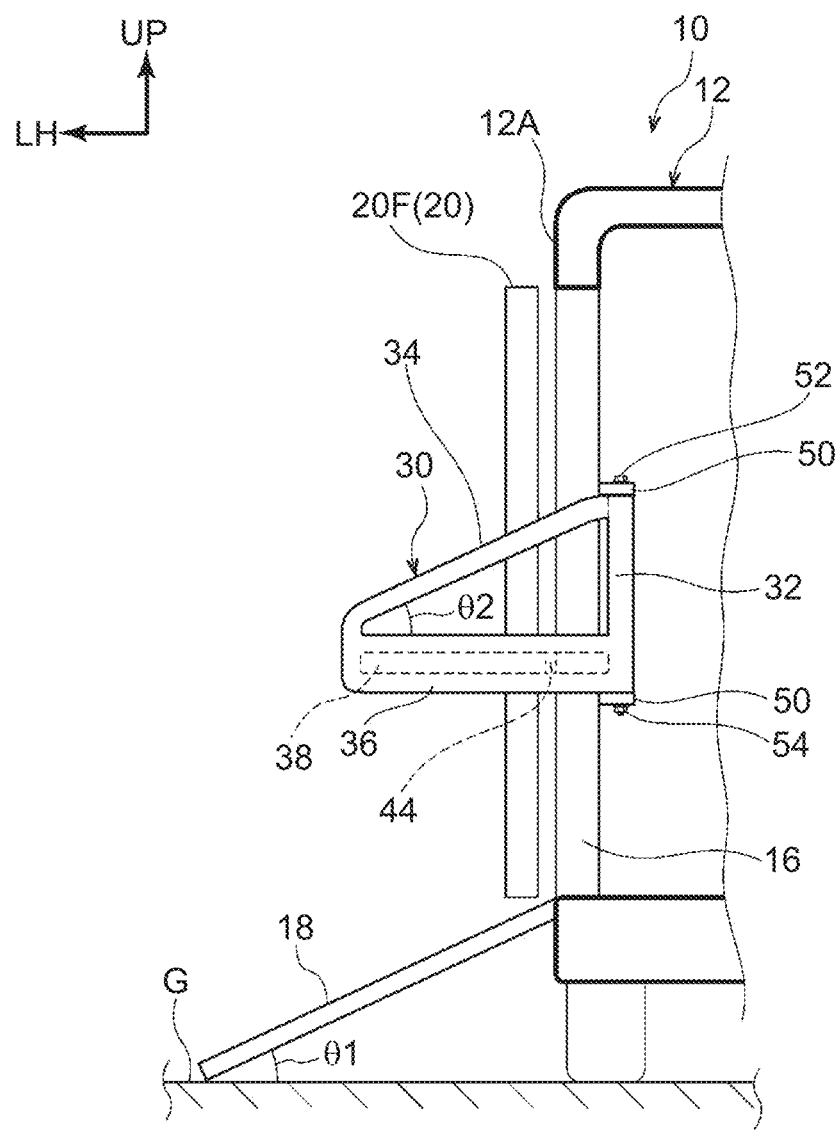

BOARDING AND EXITING HANDRAIL

CROSS-REFERENCE TO RELATED APPLICATION

This application claims priority to Japanese Patent Application No. 2019-237527 filed on Dec. 26, 2019, incorporated herein by reference in its entirety.

BACKGROUND

1. Technical Field

The present disclosure relates to a boarding and exiting handrail.

2. Description of Related Art

There are hitherto known handrails for boarding and exiting that, when a swinging door moving along an outer surface of a bus opens, protrude from an entrance-and-exit toward the outside of the vehicle, and when the swinging door closes, protrude toward the inside of the vehicle and thereby prevent passengers from approaching the entrance-and-exit (see, e.g., Japanese Patent Application Publication No. 8-118958).

SUMMARY

In the case of a small bus, a boarding and exiting handrail that is configured to protrude toward the inside of the vehicle when the swinging door closes may limit the passenger-carrying space.

Therefore, an object of the present disclosure is to obtain a boarding and exiting handrail that takes up less of a passenger-carrying space.

To achieve the above object, a boarding and exiting handrail according to claim 1 of the present disclosure includes: a base part provided near an entrance-and-exit of a vehicle so as to be rotatable with an axis oriented in a vehicle body up-down direction; a handrail main part provided on the base part and capable of being gripped by passengers boarding and exiting through the entrance-and-exit; and a rail part provided on the base part and slidably holding a sliding member mounted on a sliding door that opens and closes the entrance-and-exit by moving along an outer wall surface of the vehicle. When the sliding door opens the entrance-and-exit, the sliding member slides along the rail part toward the base part so as to bring the boarding and exiting handrail into a deployed posture with the handrail main part and the rail part protruded toward the outside of the vehicle as seen from above, and when the sliding door closes the entrance-and-exit, the sliding member slides along the rail part toward the opposite side from the base part so as to bring the boarding and exiting handrail into a retracted posture with the handrail main part and the rail part disposed along the sliding door as seen from above.

The disclosure according to claim 1 assumes the deployed posture with the handrail main part and the rail part protruded toward the outside of the vehicle as seen from above when the sliding door opens the entrance-and-exit, and assumes the retracted posture with the handrail main part and the rail part disposed along the sliding door as seen from above when the sliding door closes the entrance-and-exit. Thus, when this boarding and exiting handrail assumes the retracted posture, the handrail main part and the rail part do not protrude toward the inside of the vehicle. Therefore, when provided in a vehicle, this boarding and exiting handrail takes up less of the passenger-carrying space.

A boarding and exiting handrail according to claim 2 is the boarding and exiting handrail according to claim 1, wherein the handrail main part extends from an upper portion of the base part toward an obliquely lower side of a vehicle body, and the rail part couples together a lower portion of the base part and a leading end portion, in an extension direction, of the handrail main part.

The handrail main part of the disclosure according to claim 2 extends from the upper portion of the base part toward the obliquely lower side of the vehicle body. In the case of a vehicle provided with a slope at the entrance-and-exit, on the lower side of the vehicle body, for example, the inclination angle of this slope and the inclination angle of the handrail main part can be set to be approximately equal. This makes it easy for passengers to board and exit the vehicle by gripping the handrail main part when boarding and exiting using the slope.

A boarding and exiting handrail according to claim 3 is the boarding and exiting handrail according to claim 1 or 2, wherein the handrail main part has a circular cross-section.

The handrail main part of the disclosure according to claim 3 has a circular cross-section. This allows passengers to grip the handrail main part easily compared with when the handrail main part has, for example, a quadrangular cross-section.

A boarding and exiting handrail according to claim 4 is the boarding and exiting handrail according to any one of claims 1 to 3, wherein the sliding door is configured to open and close the entrance-and-exit as parts of the sliding door move in opposite directions, and relative to the handrail main part and the rail part provided on one part of the sliding door, the handrail main part and the rail part provided on the other part of the sliding door are shifted in the vehicle body up-down direction.

In the disclosure according to claim 4, relative to the handrail main part and the rail part provided on one part of the sliding door, the handrail main part and the rail part provided on the other part of the sliding door are shifted in the vehicle body up-down direction. This allows passengers with different heights to select and grip one of the handrail main parts that suits their own height.

As has been described above, when provided in a vehicle, the boarding and exiting handrail of the present disclosure takes up less of the passenger-carrying space.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a rear view showing a retracted posture of the boarding and exiting handrail according to the embodiment;

FIG. 6 is a plan view showing the retracted posture of the boarding and exiting handrail according to the embodiment;

FIG. 7 is a rear view showing a deployed posture of the boarding and exiting handrail according to the embodiment;

DETAILED DESCRIPTION OF EMBODIMENTS

Figure 1:
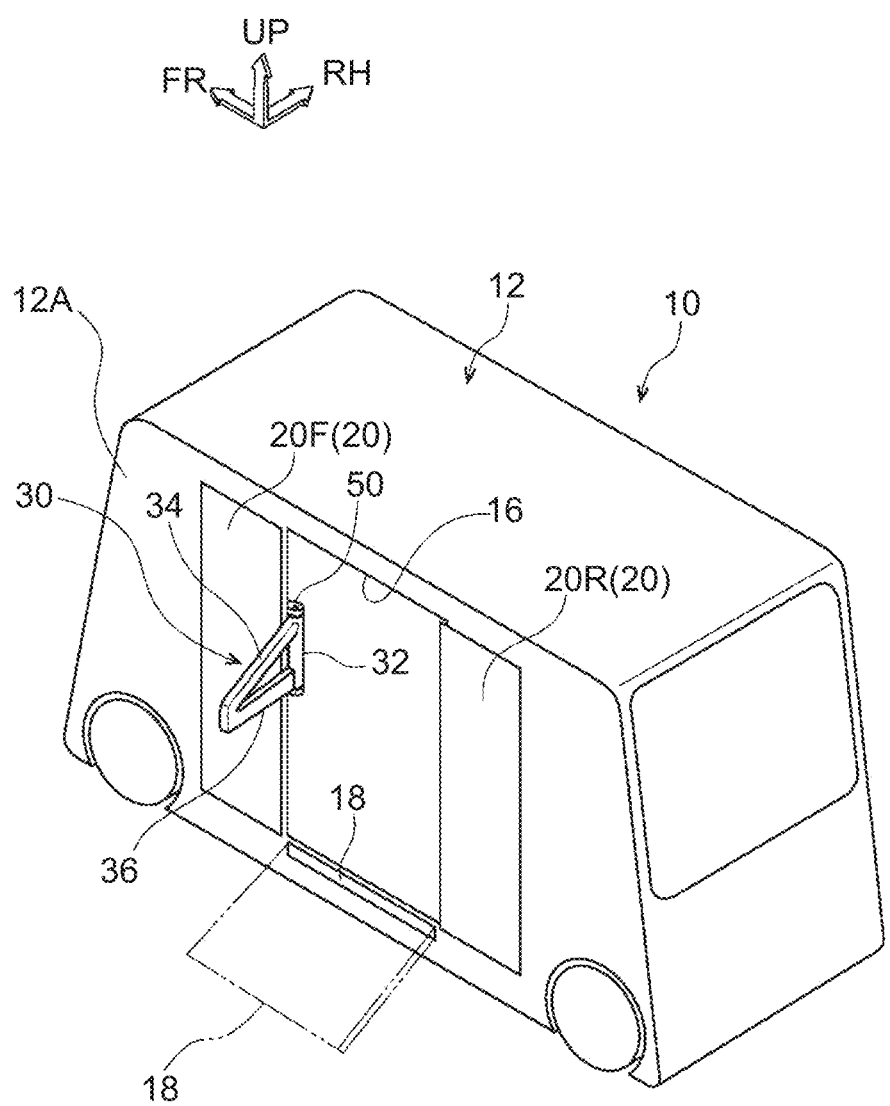
FIG. 1 is a perspective view showing a bus having a boarding and exiting handrail according to an embodiment.

An embodiment according to the present disclosure will be described in detail below based on the drawings. A boarding and exiting handrail 30 according to the embodiment is suitably provided in a small bus 10 (see FIG. 1) that is one example of passenger-carrying vehicles as vehicles (the term "bus" here includes vehicles used for Mobility-as-a-Service (MaaS) represented by self-driving buses).

For the convenience of description, arrows UP, FR, LH, and RH shown as necessary in the drawings indicate directions toward an upper side, a front side, a left side, and a right side, respectively, of a vehicle body of the bus 10. Unless otherwise noted, the directions of upward, downward, frontward, rearward, leftward, and rightward mentioned in the following description mean upward and downward in a vehicle body up-down direction, frontward and rearward in a vehicle body front-rear direction, and leftward and rightward in a vehicle body left-right direction (vehicle width direction), respectively.

As shown in FIG. 1, an entrance-and-exit 16 is formed in a left-side wall (one side wall) of a vehicle body 12 of the bus 10, at a substantially central part in the front-rear direction. The bus 10 is provided with a sliding door 20 that opens and closes the entrance-and-exit 16. The sliding door 20 is configured to be dividable at a central part in the front-rear direction and open and close the entrance-and-exit 16 as a front-side door half 20F and a rear-side door half 20R slide (move) synchronously in opposite directions along an outer wall surface 12A of the bus 10.

Figure 11A:
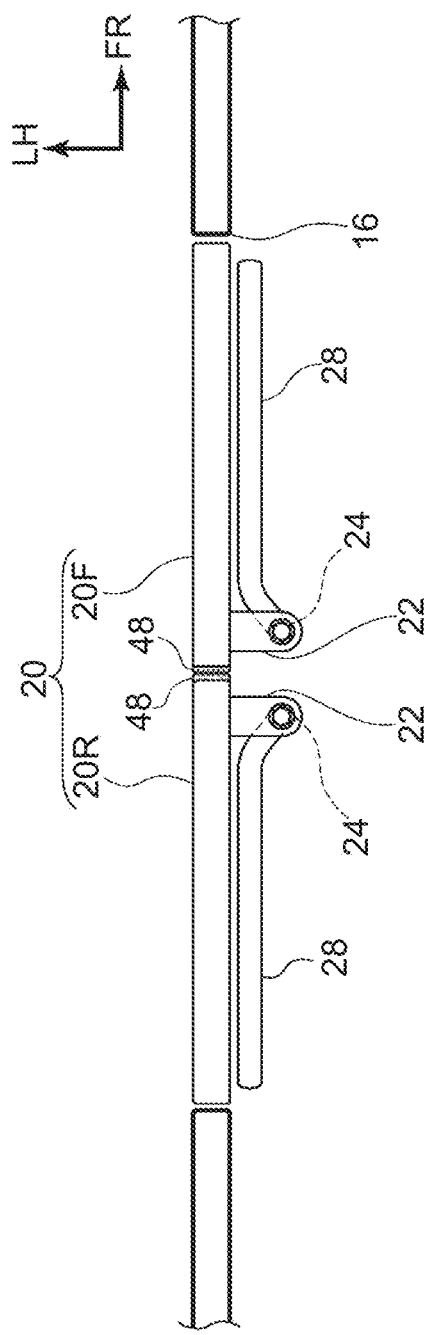
FIG. 11A is a plan view of a sliding door on which the boarding and exiting handrail according to the embodiment is provided.

Specifically, as shown in FIG. 11A, a flat-plate-shaped bracket 22 protruding toward a vehicle cabin (an inside of the vehicle) is provided at each of upper ends and lower ends of the door halves 20F, 20R of the sliding door 20, on the side where the door halves 20F, 20R come into contact with each other (hereinafter referred to as an "inner side in the front-rear direction"). The brackets 22 shown in FIG. 11A are brackets provided at the upper end of the sliding door 20 (the door half 20F and the door half 20R), and these brackets 22 and the brackets 22 that are provided at the lower end of the sliding door 20 (the door half 20F and the door half 20R) are symmetrical in the up-down direction.

Figure 11B:
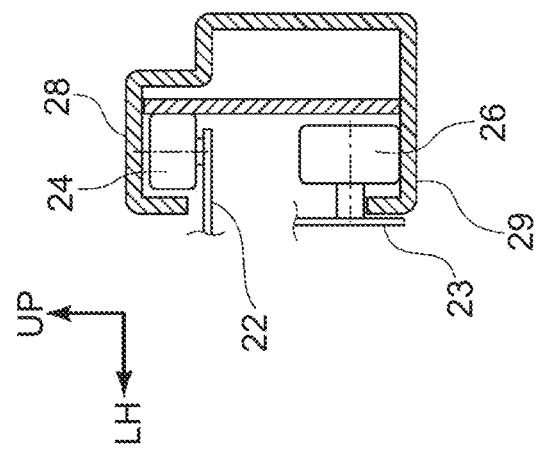
FIG. 11B is a sectional view showing rail parts on a lower side of the sliding door on which the boarding and exiting handrail according to the embodiment is provided.

Each bracket 22 rotatably supports a roller 24 (an upper-side roller shown in FIG. 11B) of which an axis is oriented in the up-down direction. The roller 24 shown in FIG. 11B is one of the rollers provided at the lower end of the sliding door 20 (the door half 20F and the door half 20R) and rotatably supported on an upper surface side of the bracket 22. The rollers 24 provided at the upper end of the sliding door 20 (the door half 20F and the door half 20R) are rotatably supported on lower surface sides of the brackets 22.

Rail parts 28 extending in the front-rear direction are formed on walls on the upper side and the lower side of the entrance-and-exit 16 of the vehicle body 12 so as to correspond respectively to the door half 20F and the door half 20R. As seen from above, an end portion of each rail part 28 on the inner side in the front-rear direction curves in a substantially arc shape toward an inner side in the vehicle width direction (see FIG. 11A). One roller 24 is rollably fitted in each rail part 28, and the sliding door 20 closes the entrance-and-exit 16 when each roller 24 is located at the farthest end of the rail part 28 on the inner side in the front-rear direction.

As shown in FIG. 11B, brackets 23 separate from the brackets 22 are provided at the lower end of the sliding door 20 (the door half 20F and the door half 20R), and each bracket 23 rotatably supports a roller 26 of which an axis is oriented in the vehicle width direction. Each roller 26 is rollably fitted in a rail part 29 that is integrally formed with the rail part 28. As seen from above, an end portion of each rail part 29 on the inner side in the front-rear direction also curves in a substantially arc shape toward the inner side in the vehicle width direction, and the sliding door 20 closes the entrance-and-exit 16 when each roller 26 is located at the farthest end of the rail part 29 on the inner side in the front-rear direction.

To open the entrance-and-exit 16, first, the door half 20F and the door half 20R move toward an outer side in the vehicle width direction as the rollers 24 roll along the end portions of the rail parts 28 on the inner side in the front-rear direction and the rollers 26 roll along the end portions of the rail parts 29 on the inner side in the front-rear direction. Then, the door half 20F slides toward the front side as the rollers 24 roll along the rail parts 28 and the rollers 26 roll along the rail parts 29. In synchronization with the door half 20F, the door half 20R slides toward the rear side as the rollers 24 roll along the rail parts 28 and the rollers 26 roll along the rail parts 29.

In this way, as the rollers 24 roll along the rail parts 28, the sliding door 20 (the door half 20F and the door half 20R) slides (moves) along the outer wall surface 12A while the position thereof in the vehicle width direction is regulated, and as the rollers 26 roll along the rail parts 29, the sliding door 20 (the door half 20F and the door half 20R) slides (moves) along the outer wall surface 12A while the position thereof in the up-down direction is regulated.

End surfaces of the door halves 20F, 20R on the inner side in the front-rear direction that come into contact with each other (in other words, a rear end surface of the door half 20F and a front end surface of the door half 20R) each have an elastic body 48, such as rubber, mounted thereon along the entire length in the up-down direction. The door halves 20F, 20R close the entrance-and-exit 16 by bringing the elastic bodies 48 thereof into contact with each other while elastically deforming the elastic bodies 48.

As shown in FIG. 1, a slope 18 that can be protruded toward the outside of the vehicle is housed in the vehicle body 12, on the lower side of the entrance-and-exit 16 (e.g., on the lower side of a floor panel). The slope 18 has a flat plate shape and is configured to be electrically pulled out and housed. As shown in FIG. 7, when pulled out, the slope 18 is disposed at a predetermined inclination angle θ1 with a leading end portion thereof in a pull-out direction supported on a road G.

As shown in FIG. 1, when the sliding door 20 (the door half 20F and the door half 20R) slides (moves) and opens the entrance-and-exit 16, the boarding and exiting handrail 30 made of metal (e.g., aluminum) is protruded from a predetermined position in the up-down direction (height direction) of the entrance-and-exit 16 toward the outer side in the vehicle width direction.

Figure 2:
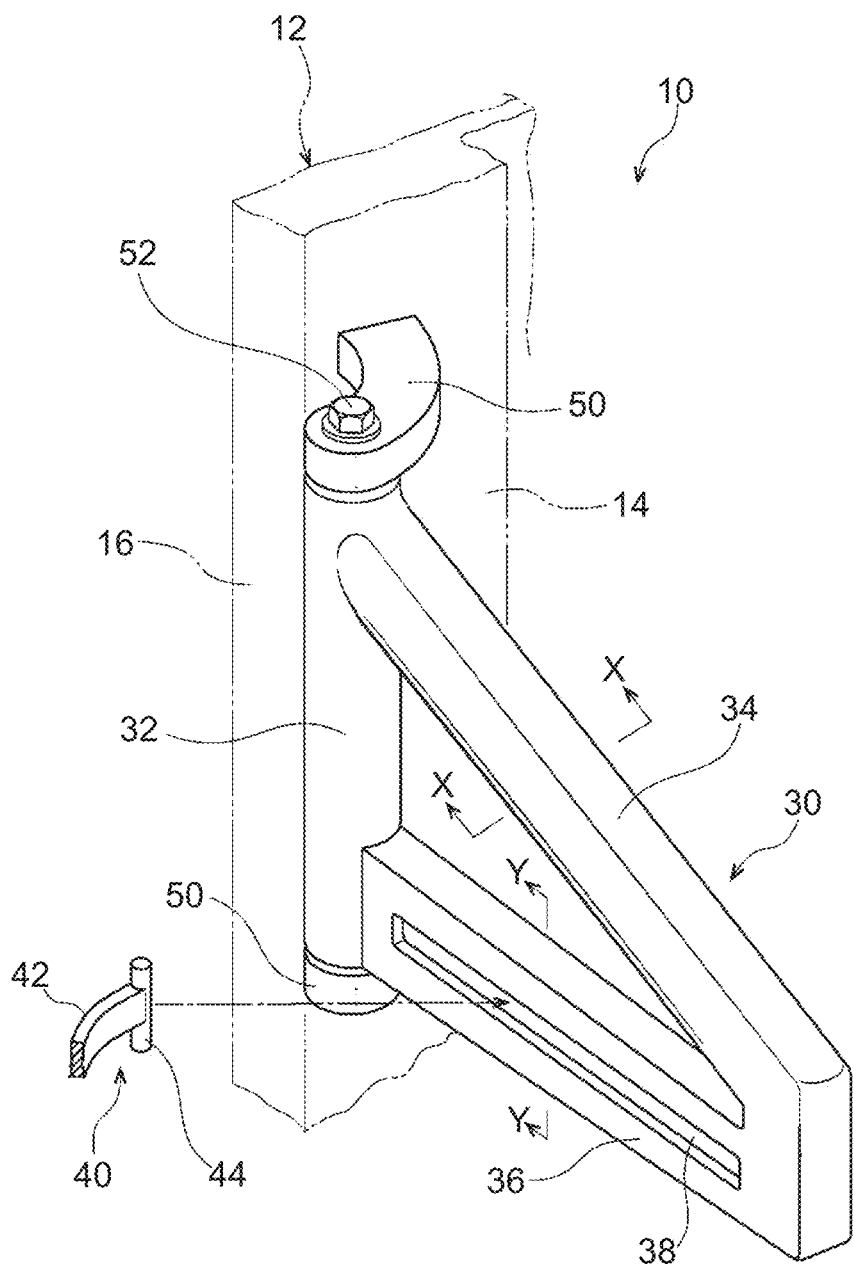
FIG. 2 is a perspective view showing the boarding and exiting handrail according to the embodiment.

Specifically, as shown in FIG. 2, the boarding and exiting handrail 30 includes a cylindrical base part 32, a handrail main part 34 of which one end portion is integrally provided on an upper portion of an outer circumferential surface of the base part 32, and a rail part 36 of which one end portion is integrally provided on a lower portion of the outer circumferential surface of the base part 32. The other end portion (a leading end portion in an extension direction) of the handrail main part 34 and the other end portion of the rail part 36 are integrally joined together.

The base part 32 is provided near the entrance-and-exit 16 of the bus 10 (e.g., on an inner wall surface of a pillar 14) so as to be rotatable with an axis oriented in the up-down direction. For example, the base part 32 is disposed between a pair of upper and lower brackets 50 provided on the inner wall surface of the pillar 14, and is rotatably supported by the brackets 50 as the shank of a bolt 52 is inserted from the upper side into a through-hole (not shown) formed in each bracket 50 and a through-hole (not shown) formed in the base part 32 and engaged with a nut 54 (see FIG. 5 and FIG. 7).

Figure 4A:
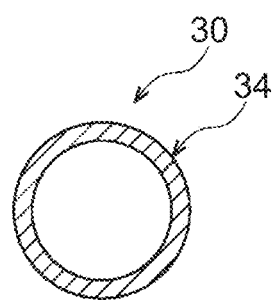
FIG. 4A is a sectional view taken along line X-X in FIG. 2.

As shown in FIG. 4A, the handrail main part 34 has a cylindrical shape (circular cross-section). As shown in FIG. 2 and FIG. 7, the handrail main part 34 extends from the upper portion of the base part 32 toward an obliquely lower side. Thus, the handrail main part 34 is disposed obliquely relative to a horizontal direction, and forms a right-angled triangle with the base part 32 and the rail part 36.

An inclination angle θ2 of the handrail main part 34 relative to the horizontal direction is set to be approximately equal to the inclination angle θ1 of the slope 18 (see FIG. 7). A protective member made of urethane, vinyl chloride, or the like (not shown) is wrapped around at least the handrail main part 34 to allow passengers to easily grip the handrail main part 34.

As shown in FIG. 2 and FIG. 7, the rail part 36 extends in a horizontal direction and integrally couples together the lower portion of the base part 32 and the other end portion (the leading end portion in the extension direction) of the handrail main part 34. The rail part 36 slidably holds a sliding member 40 (see also FIG. 3) that is mounted, for example, at the end portion of the door half 20F of the sliding door 20 on the inner side in the front-rear direction.

Figure 4B:
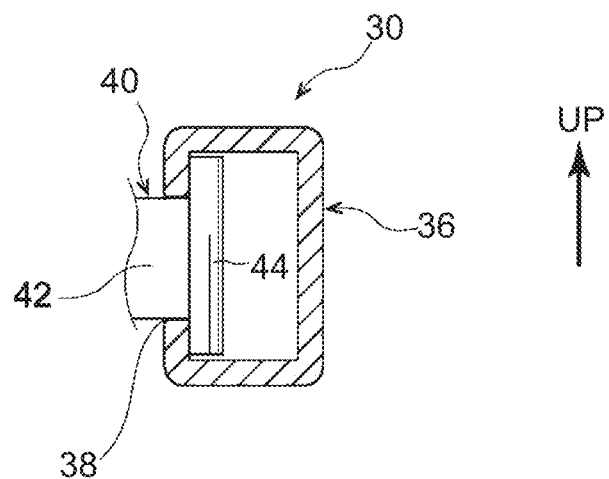
FIG. 4B is a sectional view taken along line Y-Y in FIG. 2, showing a state where the sliding member is held by the rail part.

As shown in FIG. 4B, the rail part 36 has a quadrangular tubular shape (rectangular cross-section) with a long side oriented in the up-down direction. As shown in FIG. 2, a slit 38 that has a predetermined length along the extension direction (longitudinal direction) of the rail part 36 and communicates with an inside of the rail part 36 is formed in one side wall of the rail part 36 (a side wall thereof that faces the front side when the boarding and exiting handrail 30 is in a deployed posture to be described later and faces the outer side in the vehicle width direction when the boarding and exiting handrail 30 is in a retracted posture to be described later), at a substantially central portion in the up-down direction. The rail part 36 is not gripped by passengers and therefore need not have a circular cross-section.

Figure 3:
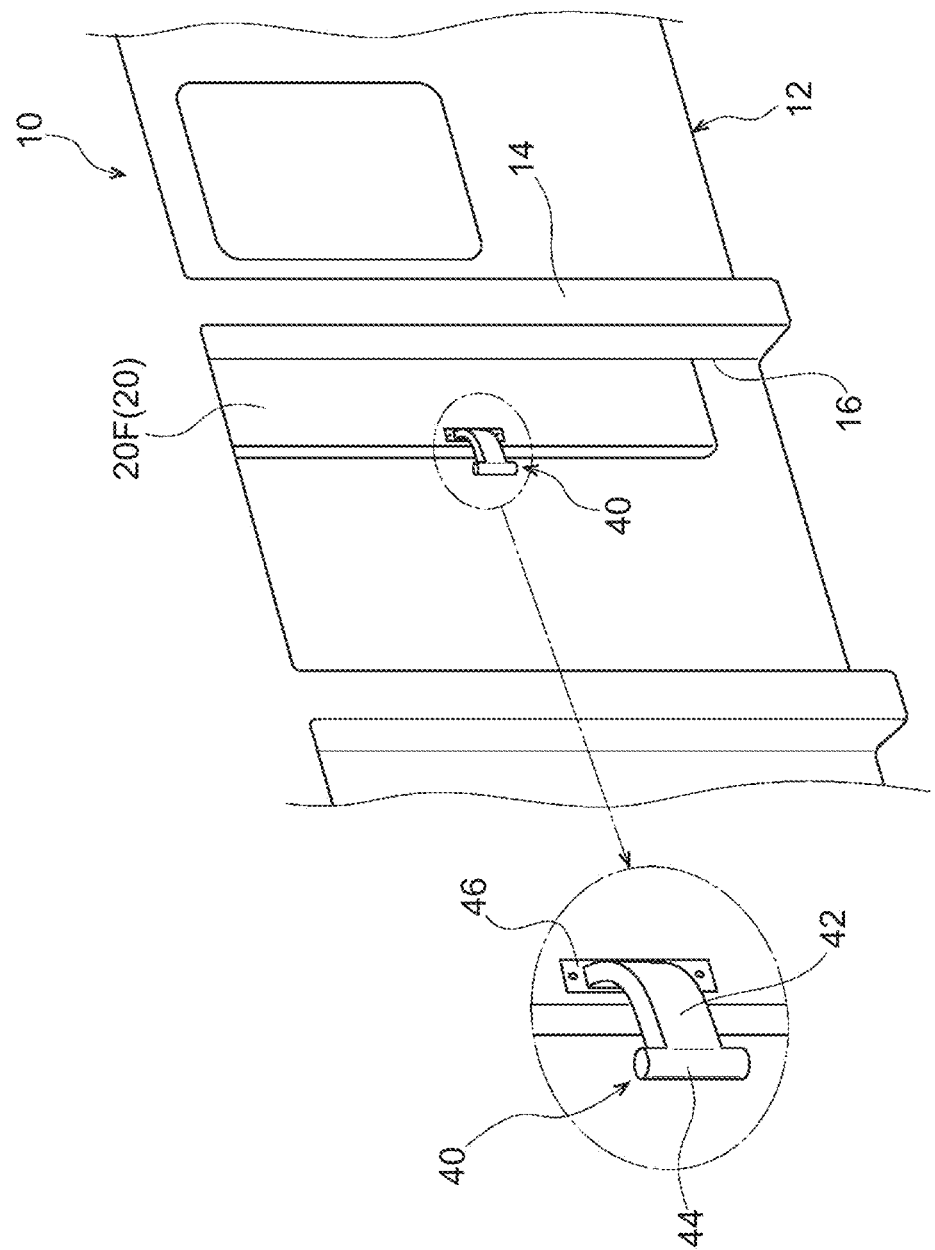
FIG. 3 is a perspective view showing a sliding member that is slidably held by a rail part of the boarding and exiting handrail according to the embodiment.

As shown in FIG. 3, the sliding member 40 has a substantially T-shape as seen from a side. The sliding member 40 has a main part 42 that has a substantially arc shape as seen from above, a fitting part 44 that has a substantially columnar shape (with an axis oriented in the up-down direction) and protrudes upward and downward from a leading end of the main part 42, and a fixing part 46 that has a flat plate shape and is formed at a base end of the main part 42 on the opposite side from the fitting part 44.

The sliding member 40 is mounted to the rail part 36 before the fixing part 46 is mounted to the door half 20F. The fitting part 44 is passed through the slit 38 of the rail part 36 in a lying posture (with the axis oriented in a horizontal direction) and turned 90 degrees. Thus, as shown in FIG. 4B, the fitting part 44 is fitted in the rail part 36 so as to be slidable in the longitudinal direction of the rail part 36 without coming off the rail part 36.

Therefore, the width of the slit 38 (the clearance in the up-down direction) is larger than the outside diameter of the fitting part 44, and is set to be equal to or slightly larger than the width of the main part 42 of the sliding member 40 (the length of the main part 42 in a direction orthogonal to a thickness direction thereof as seen from a side). After the fitting part 44 of the sliding member 40 is fitted in the rail part 36, the fixing part 46 is mounted with screws etc. to the end portion of the door half 20F on the inner side in the front-rear direction.

Next, the workings of the boarding and exiting handrail 30 configured as has been described above will be described.

As shown in FIG. 5 and FIG. 6, when the entrance-and-exit 16 is closed by the sliding door 20 (the door halves 20F, 20R), the boarding and exiting handrail 30 is disposed almost along the sliding door 20 (in the shown case, along the door half 20F) as seen from above. Specifically, when the sliding door 20 closes the entrance-and-exit 16, the sliding member 40 slides along the rail part 36 toward the opposite side from the base part 32 (toward the other end portion) so as to bring the boarding and exiting handrail 30 into the retracted posture with the handrail main part 34 and the rail part 36 disposed along the sliding door 20.

Thus, when the boarding and exiting handrail 30 assumes the retracted posture, the handrail main part 34 and the rail part 36 do not protrude toward the inside of the vehicle (toward the vehicle cabin). Therefore, especially when provided in the small bus 10, the boarding and exiting handrail 30 takes up less of the passenger-carrying space (leaves as much of the passenger-carrying space as possible).

Figure 8:
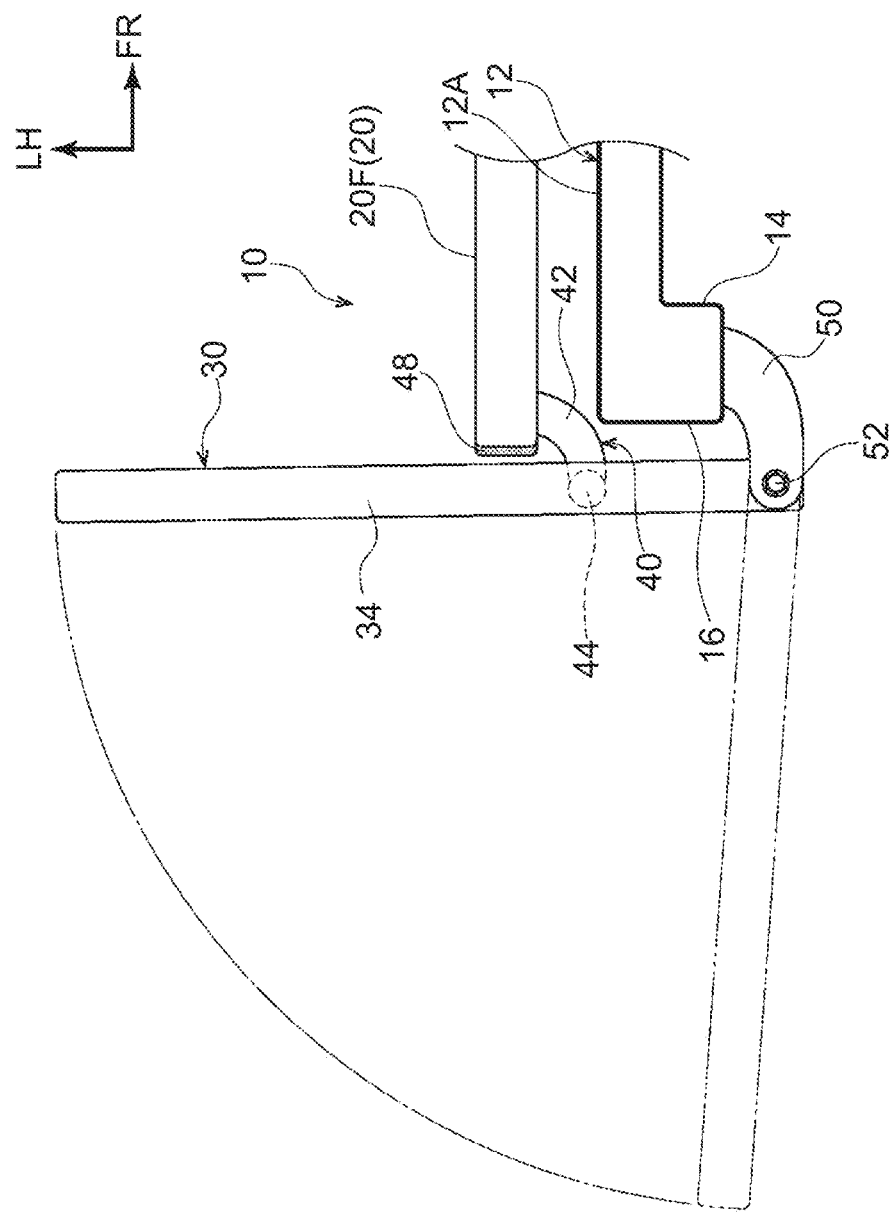
FIG. 8 is a plan view showing the deployed posture of the boarding and exiting handrail according to the embodiment.

On the other hand, when the entrance-and-exit 16 is opened by the sliding door 20 (the door halves 20F, 20R) as shown in FIG. 7 and FIG. 8, the boarding and exiting handrail 30 is protruded toward the outside of the vehicle as seen from above. Specifically, when the sliding door 20 opens the entrance-and-exit 16, the sliding member 40 slides along the rail part 36 toward the base part 32 so as to bring the boarding and exiting handrail 30 into the deployed posture with the handrail main part 34 and the rail part 36 protruded toward the outside of the vehicle (the outer side in the vehicle width direction).

Therefore, passengers can grip the handrail main part 34 when boarding and exiting the bus 10, which allows them to board and exit the bus 10 easily (to do so in a stable posture). In particular, passengers stand momentarily on one foot when lowering the other foot during exit. The handrail main part 34 provided in front of passengers in their advancing direction helps them stand firm so as to further stabilize their posture. Moreover, the handrail main part 34 has a circular cross-section, which allows passengers to grip the handrail main part 34 easily compared with when the handrail main part 34 has, for example, a quadrangular cross-section.

The handrail main part 34 extends from the upper portion of the base part 32 toward the obliquely lower side. In the case of the bus 10 provided with the slope 18 on the lower side of the entrance-and-exit 16, for example, the inclination angle θ1 of the slope 18 and the inclination angle θ2 of the handrail main part 34 can be set to be approximately equal (such that the slope 18 and the handrail main part 34 are substantially parallel to each other as seen from the rear side). Thus, passengers can change the level of their fingers as the level of their body changes when boarding and exiting the bus 10 using the slope 18, which allows them to board and exit the bus 10 easily by gripping the handrail main part 34 (to do so in a more stable posture).

When the boarding and exiting handrail 30 assumes the deployed posture, a clearance wide enough to insert fingers is left between the handrail main part 34 and the elastic body 48 mounted on the end surface of the door half 20F on the inner side in the front-rear direction. Therefore, even when passengers put their fingers between the handrail main part 34 and the elastic body 48 (touch the elastic body 48 with their fingers) while boarding and exiting by gripping the handrail main part 34, their fingers are unlikely to get hurt. Thus, passenger safety is ensured.

Figure 9:
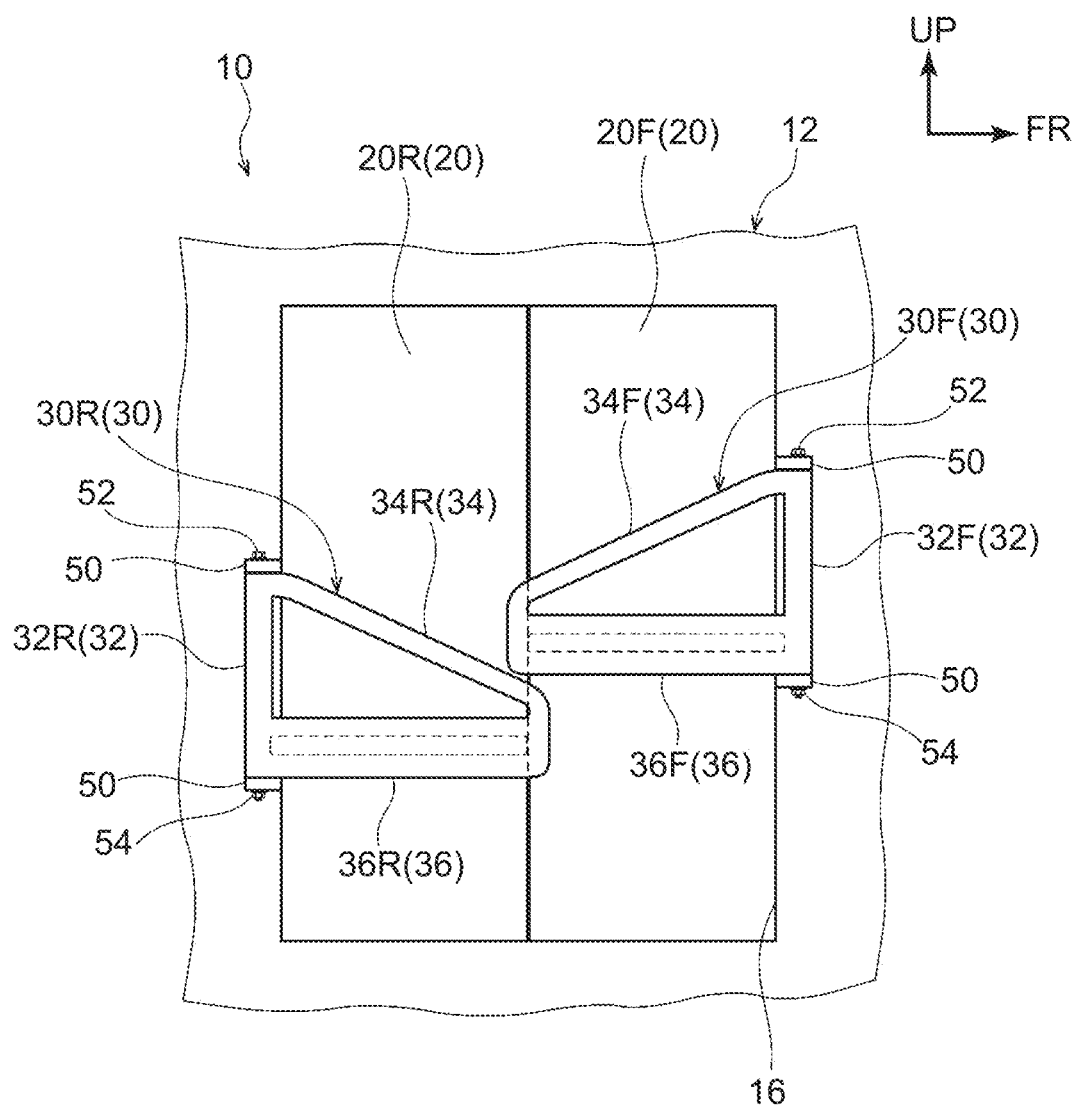
FIG. 9 is a side view as seen from a vehicle cabin side, showing a case where the boarding and exiting handrail according to the embodiment is provided on each of left and right door halves.

The configuration of the present disclosure is not limited to the one in which the boarding and exiting handrail 30 is provided on only one of the door halves of the sliding door 20 (e.g., on the door half 20F). A configuration in which the boarding and exiting handrail 30 is provided also on the other door half of the sliding door 20 (e.g., on the door half 20R) may be adopted. In this case, as shown in FIG. 9, relative to a boarding and exiting handrail 30F provided on the door half 20F, a boarding and exiting handrail 30R provided on the door half 20R is shifted in the up-down direction.

For example, relative to a base part 32F, a handrail main part 34F, and a rail part 36F provided on the door half 20F, a base part 32R, a handrail main part 34R, and a rail part 36R provided on the door half 20R are shifted downward. This is because, due to the structure of the boarding and exiting handrail 30, the other end portions of the handrail main part 34F and the rail part 36F provided on the door half 20F protrude toward the door half 20R, while the other end portions of the handrail main part 34R and the rail part 36R provided on the door half 20R protrude toward the door half 20F.

Thus shifting the base part 32R, the handrail main part 34R, and the rail part 36R provided on the door half 20R in the up-down direction relative to the base part 32F, the handrail main part 34F, and the rail part 36F provided on the door half 20F has an advantage that passengers with different heights can select and grip one of the handrail main part 34F and the handrail main part 34R that suits their own height. Of course, the positions of the sliding members 40 that are mounted respectively on the door halves 20F, 20R are also shifted in the up-down direction according to the positions of the boarding and exiting handrails 30F, 30R.

In this configuration, a substantially middle portion of the sliding door 20 (the door half 20F and the door half 20R) in the up-down direction is supported by the rail part 36F of the boarding and exiting handrail 30F and the rail part 36R of the boarding and exiting handrail 30R through the sliding members 40. This can eliminate the need for rollers 24 that are provided at a substantially middle portion of an ordinary sliding door (not shown) in the up-down direction and for rail parts 28 that are provided on the side of the vehicle body 12 so as to correspond to the rollers 24.

Figure 10:
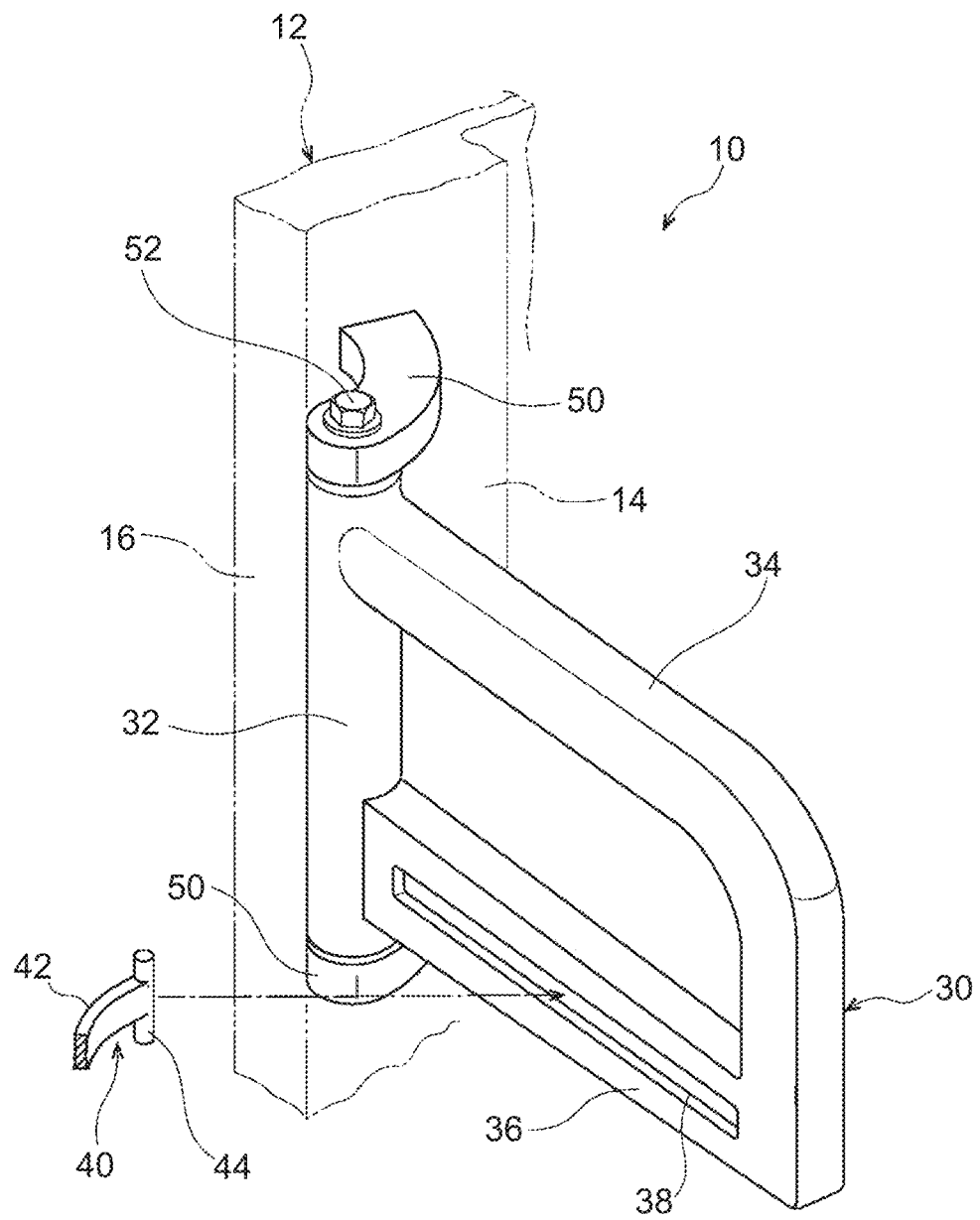
FIG. 10 is a perspective view showing a modified example of the boarding and exiting handrail according to the embodiment.

The shape of the handrail main part 34 of the boarding and exiting handrail 30 is not limited to that shown in FIG. 1 to FIG. 9. As shown in FIG. 10, in the case of a bus 10 that does not have the slope 18, the handrail main part 34 of the boarding and exiting handrail 30 may have, for example, a substantially L-shape as seen from a side. Thus, the handrail main part 34 may form a substantially quadrangular shape with the base part 32 and the rail part 36.

While the boarding and exiting handrail 30 according to the embodiment has been described above based on the drawings, the boarding and exiting handrail 30 according to the embodiment is not limited to that shown in the drawings and design changes can be made thereto as necessary within the scope of the gist of the disclosure. For example, the cross-sectional shape of the handrail main part 34 is not limited to a circular shape and may instead be a substantially regular hexagonal shape with arc-shaped corners.

What is claimed is:

1. A boarding and exiting handrail, comprising:
   a base part provided near an entrance-and-exit of a vehicle so as to be rotatable with an axis oriented in a vehicle body up-down direction;
   a handrail main part provided on the base part and capable of being gripped by passengers boarding and exiting through the entrance-and-exit; and
   a rail part provided on the base part and slidably holding a sliding member mounted on a sliding door that opens and closes the entrance-and-exit by moving along an outer wall surface of the vehicle, wherein
   when the sliding door opens the entrance-and-exit, the sliding member slides along the rail part toward the base part so as to bring the boarding and exiting handrail into a deployed posture with the handrail main part and the rail part protruded toward an outside of the vehicle as seen from above, and when the sliding door closes the entrance-and-exit, the sliding member slides along the rail part toward the opposite side from the base part so as to bring the boarding and exiting handrail into a retracted posture with the handrail main part and the rail part disposed along the sliding door as seen from above.

2. The boarding and exiting handrail according to claim 1, wherein:
   the handrail main part extends from an upper portion of the base part toward an obliquely lower side of a vehicle body; and
   the rail part couples together a lower portion of the base part and a leading end portion, in an extension direction, of the handrail main part.

3. The boarding and exiting handrail according to claim 1, wherein the handrail main part has a circular cross-section.

4. The boarding and exiting handrail according to claim 1, further comprising a second sliding door, wherein:
   the sliding door and the second sliding door are configured to open and close the entrance-and-exit as the sliding door and the second sliding door move in opposite directions; and
   a second handrail main part and a second rail part provided on the second sliding door, wherein relative to the handrail main part and the rail part provided, the second handrail main part and the second rail part provided on the second sliding door are shifted in the vehicle body up-down direction.

\* \* \* \* \*